US008086863B2

(12) United States Patent
Rits

(10) Patent No.: US 8,086,863 B2
(45) Date of Patent: Dec. 27, 2011

(54) METHOD AND A SYSTEM FOR PROTECTING PATH AND DATA OF A MOBILE AGENT WITHIN A NETWORK SYSTEM

(75) Inventor: Maarten Rits, Nice (FR)

(73) Assignee: SAP AG, Walldorf (DE)

( * ) Notice: Subject to any disclaimer, the term of this patent is extended or adjusted under 35 U.S.C. 154(b) by 1179 days.

(21) Appl. No.: 11/776,180

(22) Filed: Jul. 11, 2007

(65) Prior Publication Data

US 2008/0253571 A1 Oct. 16, 2008

(30) Foreign Application Priority Data

Jul. 11, 2006 (EP) .................................... 06291145

(51) Int. Cl.
*H04L 9/32* (2006.01)
(52) U.S. Cl. ........ 713/181; 713/153; 713/168; 713/176; 726/2; 726/3; 726/4; 726/5; 726/6; 380/277; 380/278; 709/202
(58) Field of Classification Search .................. 713/157, 713/168, 181, 153, 176; 380/277–278; 726/2–6; 709/202
See application file for complete search history.

(56) References Cited

U.S. PATENT DOCUMENTS

| | | | | |
|---|---|---|---|---|
| 6,233,601 B1 * | 5/2001 | Walsh | ........................... | 709/202 |
| 7,287,166 B1 * | 10/2007 | Chang et al. | .................. | 713/187 |
| 7,577,852 B2 * | 8/2009 | Okazaki et al. | ............... | 713/189 |
| 2002/0065777 A1 * | 5/2002 | Kondo et al. | .................... | 705/54 |
| 2002/0144118 A1 * | 10/2002 | Maruyama | .................... | 713/170 |

OTHER PUBLICATIONS

Ordille, Joann, J.,"When agents roam, who can you trust?", IEEE, 1996.*
European Search Report, (Feb. 6, 2007).
Jansen, W. A., "Countermeasures for mobile agent security", Computer Communications, Elsevier Science Publishers BV, Amsterdam, NL, (Nov. 1, 2000),1667-1676.
Negm, K.E.A. "Design, implementation and testing of mobile agent protection mechanism for MANETS", The 3rd ACS/IEEE International Conference on Computer Systems and Applications, Cairo, Egypt, (Jan. 3, 2005), 519-526.
Corradi, A. et al., "Mobile agents protection in the Internet environment", The 23rd Annual International Computer Software and Applications Conference, Phoenix, AZ, COMPSAC '99, (Oct. 27, 1999),80-85.
Alfalayleh, M. et al., "Scout and routed mobile agents", 3rd IEEE International Conference on Industrial Informatics, Perth, Australia, (Aug. 10, 2005), 667-674.

(Continued)

*Primary Examiner* — Yin-Chen Shaw
(74) *Attorney, Agent, or Firm* — Brake Hughes Bellermann LLP

(57) ABSTRACT

Secure message transfer of at least one message from a sender to a receiver within a network system may be provided. For example, a message structure information regarding the at least one message may be computed on a sender-side and according to a pre-given scheme. The computed message structure information may be added as message account information into the at least one message to be sent. The message account information may be protected by a signature. The at least one message may be transferred through the network system to the receiver. On a receiver-side, the message account information may be validated after reception of the at least one message and according to the pre-given scheme.

26 Claims, 3 Drawing Sheets

OTHER PUBLICATIONS

Ordille, J J., "When agents roam, who can you trust?", First Annual Conference on Emerging Technologies and Applications in Communications, Portland, OR, (May 7, 1996),188-191.

Karnik, N M., et al., "Security in the Ajanta Mobile Agent System", Software Practice & Experience, Wiley & Sons, Bognor Regis, GB, (Apr. 10, 2001), 301-329.

* cited by examiner

Figure 1 (Prior Art)

$r = \{ip(S_0), ip(S_2), [ip(S_A), ip(S_1), ip(S_2), t, \{\ldots\}KS_2]\ PKS_0\}KS_1$ $\{\ldots\}KS_2 = \{ip(S_1), ip(S_3), [ip(S_1), ip(S_2), ip(S_3), t, \{\ldots\}KS_3]\ PKS_0\}KS_2$

...

...

$\{\ldots\}KS_{n-1} = \{ip(S_{n-2}), ip(S_n), [ip(S_{n-2}), ip(S_{n-1}), ip(S_n), t, \{\ldots\}KS_n]\ PKS_0\}KS_{n-1}$ $\{\ldots\}KS_n = \{ip(S_{n-1}), End, [ip(S_{n-1}), ip(S_n), End, t, \{\ldots\}KS_3]\ PKS_0\}KS_n$

Figure 2

$Data\_S_i = [r0, ip(S_{i-1}), ip(S_i), \{S_iKo\}KS_i, h(KS_0, S_iKo), \{m_i\}S_iKo]PKS_0$ with $m_i = m'_i, ip(S_{i+1}), Data\_S_{i+1}$ wherein:

Data_S$_{i+1}$ = [r0, ip(S$_i$), ip(S$_{i+1}$), {S$_{i+1}$K0}KS$_{i+1}$, h(KS0, S$_{i+1}$K0), {m'$_{i+1}$}S$_{i+1}$K0]PKS0 m'$_{i+1}$ = m$_{i+1}$, ip(S$_{i+2}$), Data_S$_{i+2}$

METHOD AND A SYSTEM FOR PROTECTING PATH AND DATA OF A MOBILE AGENT WITHIN A NETWORK SYSTEM

CROSS-REFERENCE TO RELATED APPLICATION

This application claims priority under 35 U.S.C. §119 to European Patent Application EP06291145.8, filed Jul. 11, 2006, titled "A method and a system for protecting path and data of a mobile agent within a network system," which is incorporated herein by reference in its entirety.

TECHNICAL FIELD

This description refers to the field of mobile agent technology, particularly to mobile agent security in network systems.

BACKGROUND

In computer science, a mobile agent is a composition of computer software and data which is able to migrate from one server to another autonomously and continue its execution on a destination server. A mobile agent inherits some of the characteristics of an agent. An agent is a computational entity which acts on behalf of other entities in an autonomous fashion, performs its actions with some level of proactivity and/or reactiveness and exhibits some level of key attributes of learning, cooperation and mobility. A mobile agent, namely, is a type of a software agent, with the feature of autonomy, social ability, learning, and most important, mobility. When the term mobile agent is used, it refers generally to a process that can transport its state from one environment to another, with its data intact, and still be able to perform appropriately in the new environment. The mobile agent environment is, generally speaking, a software system that is distributed over a network system of heterogeneous servers. Its primary task is to provide an environment in which mobile agents can execute. The mobile agent environment is built on top of a host system. Mobile agents travel between mobile agent environments. They can communicate with each other either locally or remotely. Finally, communication can also take place between a mobile agent and a host service. Mobile agents are active in that they may choose to migrate between servers at any time during the execution. This makes them a powerful tool for implementing distributed applications in a network system. During their route through the network system mobile agents can carry data with them. These data can be data that is necessary for their execution on a certain server and results from calculations that have been performed on a certain server. The route of a mobile agent can be defined in advance, or the mobile agent can adapt its route on its way based on certain events. After the completion of their tasks most mobile agents return to their departure point to return the results they gathered.

There are quite a lot of advantages of using mobile agents which are described in the following. Mobile agents reduce network traffic. Some applications first download a large amount of data from a server and then process this data to a smaller amount, e.g. search and filter applications like for example data-mining. If one would use mobile agents for these programs, then these mobile agents would be able to execute the work on the server itself, without congesting the network system because only the results of the calculation will be sent back.

Furthermore, by means of mobile agents, an asynchronous and autonomous execution on multiple heterogeneous network servers is possible. Some applications need a large amount of client-server interactions which can be done through classic client-server method invocations or with web services used in a so-called Enterprise Services Architecture (ESA). Also in this case mobile agents can be more efficient. A mobile agent can work asynchronously and autonomously while the system that sent the mobile agent is no longer connected to the network system. Mobile servers like laptops and PDAs, that mostly have an uncertain and expensive connection with relative low bandwidth, can therefore make proper use of mobile agents.

Moreover, mobile agents have the possibility to adapt themselves to changes in their execution environment. This is why mobile agents can be used for example in load-balancing. When a server is starting to become overloaded, some processes can be placed to another server within the network system in the form of a mobile agent, where they can continue the execution. Also other application scenarios exist where intelligent agents can make efficient decisions based on the changing execution environment. An e-business scenario with mobile agents would allow, for example, to find the cheapest price for an airplane ticket, car rental and hotel booking. Most airlines have deals with car rental companies and hotels. This information is available when the mobile agent will visit the server of the airline company. The mobile agent will collect the prices of the airplane ticket and then continues its route to the service of cooperating car rental companies and hotels.

As already mentioned, the use of mobile agents is tolerant of network faults. Mobile agents are able to operate without an active connection between a client and a server.

Common applications of mobile agents include for example resource availability, discovery, monitoring, information retrieval, network management and dynamic software deployment.

If one wants to execute a mobile agent on a server, then this mobile agent comes under the complete control of the server. If a server has malicious intentions and wants to change the mobile agent or simply delete the mobile agent, this is impossible to prevent. However, it should be tried to make targeted, malicious changes impossible by applying detection mechanisms. With cryptographic techniques one can try to make sure that a server cannot read information that is not targeted towards it. The fact that the mobile agent travels from one server to another causes, however, that classic methods are not sufficient anymore to protect these mobile agents.

There are some existing methods to protect mobile agents against servers. Generally, there are two categories of existing methods to protect mobile agents against servers, namely so-called Blackbox methods and Partial Protection methods.

The goal of Blackbox methods is to hide the whole program code of a mobile agent for a server, so that the intention of the mobile agent is not clear and the server will not be able to make targeted modifications. There are basically three different approaches in this category.

A first approach can be called "Tamper-free Hardware". One uses here a special manufactured tool as execution environment for the mobile agents. The internal specifications of the system are physically separated from the outside world and impossible to maintain without damaging the tool, which can be easily verified. This approach gives a very good protection. However, it is practically unacceptable on a large scale because of the high manufacturing costs. For more information reference is made to "U. G. Wilhelm, S. Staamann, L. Buttyan. Introducing Trusted Third Parties to the Mobile Agent Paradigm. In J. Vitek and C. Jensen, Secure Internet Programming: Security Issues for Mobile and Distributed Objects, volume 1603, pages 471-491. Springer-Verlag, New York, N.Y., USA, 1999" and "Bennet Yee. Using Secure Coprocessors. PhD Thesis, May 1994".

A further approach can be called "Obfuscated Code". This approach tries to rearrange the code of the mobile agent in such a way that it becomes incomprehensible, but still has the same effect. The technique is closely related to obfuscation techniques to prevent reverse engineering. At this moment there is no method that makes the code incomprehensible infinitely in time. If one has enough processing capacity, one can rediscover the signification of the code. A less strict variant of this approach is the time limited protection, i.e. the obfuscated code is only valid for a certain period in time, and after that the mobile agent becomes invalid. A large problem here is that one has not yet defined ways to calculate the effectiveness of the obfuscation algorithms. In other words, it is not possible to calculate an underlimit for the time. More information can be found in "Fritz Hohl. Time Limited Blackbox Security: Protecting Mobile Agents from Malicious Hosts. In Giovanni Vigna, Mobile Agent Security, pages 92-113. Springer-Verlag. 1998".

A further approach refers to Mobile Cryptography. Suppose one has an algorithm to calculate a function f and one wants to know from a certain input value x the function value f(x) on a server without the server knowing f. This would be possible if one could encrypt f in a way that E[f(x)], the function value of x calculated with the encrypted function, could be decrypted back to f(x). This technique is very promising, but the biggest challenge remains to develop encryption schemas E for arbitrary functions f. For now E exists only for certain classes of polynomials and rational functions as it is described in reference "T. Sander and C. Tschudin. Towards Mobile Cryptography. In Proceedings of the IEEE Symposium on Security and Privacy, Oakland, Calif., 1998".

Instead of covering the whole mobile agent for the servers in the approach of partial protection, part of the mobile agent will be protected, like confidential information that the mobile agent carries with him. In this case, however, the servers can perform targeted attacks against the mobile agents, which was not possible with blackbox methods. The mobile agents are vulnerable to so-called cut-and-paste attacks. One can remove data from a mobile agent and use another mobile agent to get to know the confidential information.

The purpose of an existing method described in the following and further described in reference "Neeran M. Karnik and Anand R. Tripathi. Security in the Ajanta mobile agent system. Software, Practice and Experience, 31(4): 301-329, 2001", is to make data that the mobile agent carries with him only accessible to certain servers. It is assumed in the following that the servers within the network system are all provided with a pair of a public key and a private key, respectively. One could try to make data that a mobile agent carries with it only accessible to certain servers by encrypting those data with the respective public keys of the servers. To check the integrity and the authenticity of the data one can then also calculate a digital signature on the whole. This can be described by the following mathematical term:

$$[\{m_1\}KS_1, \ldots, \{m_n\}KS_n]PKS_0 \quad (1)$$

wherein $m_i$ is a message for a server $S_i$, $KS_i$ is the public key of server $S_i$ and $PKS_0$ is the private key of the owner of the respective mobile agent, namely the server $S_0$.

When a mobile agent arrives on a certain server, this server verifies first the signature on the whole data structure with the public key of the agent owner. After this operation, the server checks if the mobile agent carries messages that are destinated for that server. If this is the case, the respective server can decrypt these messages with its private key and make them available to the mobile agent, if appropriate.

This described method makes use of classic cryptographic techniques to protect the data of the mobile agent. However, because the mobile agents migrate from one server to another before returning to their home server, the mobile agents need additional protection. This will become clear from the description of the following attack.

To clarify the attack described in the following, the assumption is made that the mobile agent only carries one message. The server owning the mobile agent as well as each server within the network system is associated with a pair of a public key and a private key, respectively. Suppose that a server A wants to send a secret message to a server B via a network system. Server A encrypts this secret message with the public key of server B. Then server A sends a mobile agent on its way through the network system to the respective server B. For simplicity it is assumed in the following that the mobile agent only consists of its program code PA and its container containing the message. It is assumed further that the mobile agent first arrives on a server of user E on its way to server B. This scenario can be described as follows:

$$A \Rightarrow E:PA,[\{mB\}KB]PKA \quad (2)$$

wherein PA is the program code of the mobile agent, mB is the secret message for server B, KB is the public key of server B and PKA is the private key of server A as the owner of the mobile agent.

Server E can in this situation just remove the private key as the signature of server A, put the encrypted message mB in its own agent and sign the whole data container with its own private key PKE. Then server E can send the mobile agent to server B which can be described as follows:

$$E \Rightarrow B:PE,[\{mB\}KB]PKE,$$

$$B:PE,[\{mB\}KB]PKE \Rightarrow \{\{mB\}KB\}PKB=mB \quad (3)$$

wherein PE describes the program code of the mobile agent owned by server E and PKE describes the signature, namely the private key of server E as the owner of the new mobile agent.

Server B decrypts unaware of server E's intents the message mB and makes it available to the actual mobile agent. If server E programs its mobile agent's code PE in a way that it keeps track of the message mB, then server E has full access to this secret message mB when the mobile agent returns back to server E which can be described as follows:

$$B \Rightarrow E:PE,[\{mB\}KB]PKE,mB \quad (4)$$

The purpose of another existing method described in the following and further described in reference "Green, S., Somers, F., Hurst, L., Evans, R., Nangle, B., Cunningham, P.; Software agent: A review, May (1997)" is to add data that an agent finds on a server to a secure data container. It is assumed in the following, as already mentioned, that the servers within the network system are all provided with a pair of a public key and a private key, respectively. Also the server from which the mobile agent is sent out, in the following called the first server, has a public key and a private key. Before sending a mobile agent on its route through the network system a nonce $N_o$ is first encrypted with the public key of the first server, namely the server from which the mobile agent will be sent out. Within the scope of the present specification the term first server, agent owner and the server from which the mobile agent is sent out are used synonymously. The encrypted nonce $N_o$ is kept secret and thus only known by the first server and can be written as follows:

$$C_o = \{N_o\}KS_0 \qquad (5)$$

wherein $N_o$ is the mentioned nonce, $KS_0$ is the public key of the first server and $C_o$ is the encrypted nonce.

When the mobile agent wants to take data $X_i$ with it from a certain server $S_i$, the mobile agent asks the respective server $S_i$ to sign the data $X_i$ with its private key. Thus, a new checksum is being calculated which can be described by the following mathematical term:

$$C_i = \{C_{i-1}, [X_i]PKS_i, S_i\}KS_0 \qquad (6)$$

wherein $C_i$ describes the i'th checksum, $C_{i-1}$ the i−1'th checksum, $X_i$ the data the mobile agent wants to take with it from the server $S_i$, $PKS_i$ the private key of server $S_i$, $S_i$ a server code of the server $S_i$, and $KS_0$ the public key of the first server from which the mobile agent is sent out.

The mobile agent carries now the data which it takes from different servers on its route through the network system and the actual checksum which is calculated successively on the different servers. The data may be kept in a data container. The data the mobile agent takes with it remain visible to the other servers. If one wants to prevent this, one can encrypt the data with the public key of the first server. When the mobile agent returns home, i.e. to the first server, it can be checked by the first server if the mobile agent has been modified on its route through the network system. To do this one proceeds in the other direction by deflating the checksum and verifying the signature on the data which can be described by the following mathematical term:

$$\{C_i\}PKS_0 = C_{i-1}, [X_i]PKS_i, S_i \qquad (7)$$

wherein $C_i$ is the i'th checksum, $PKS_0$ is the private key of the first server, $C_{i-1}$ is the i−1'th checksum, $X_i$ is the data the mobile agent has gathered from the server $S_i$, $PKS_i$ is the private key of server $S_i$ and $S_i$ is a server code of server $S_i$ itself.

When at a certain point a verification of the signature fails the data that has been checked so far can be regarded as trustable, but the data further contained in the remaining checksum cannot be trusted anymore. When finally the whole checksum has been successfully deflated, one should get the nonce $N_o$ so that it is certain that the data container is part of the mobile agent and it is not the data container of another mobile agent.

This described method also makes use of classic cryptographic techniques to protect a data transfer of a mobile agent. However, since the mobile agents migrate from one server to another before returning to their home server, the mobile agents need additional protection. This will become clear from the description of the following attack.

It is assumed in the following that a first server $S_0$ sends out a mobile agent which is intended to reach a specific server B. On its way through the network the mobile agent from server $S_0$ arrives at an intermediary server E. It is supposed that server E gets the mobile agent from server $S_0$ and that server E knows an old value of a checksum $C_i$ of a sequence of checksums $C_1$ to $C_n$ wherein i is smaller that n. This is possible for example if there is a loop in the route of the mobile agent on its way through the network system or if server E collaborates with another server where the mobile agent already went on its route through the network. Server E can now just starting from the i'th element, leave elements out of the data container, change or add elements in the name of other servers. To do this server E makes its own mobile agent that carries a message $X_{i+1}$ with it that server E wants to add at the i+1'th position and its own data container. Server E sends its own mobile agent with program code PE together with the checksum $C_i$ to server B which can be described as follows:

$$E \Rightarrow B: PE, X_{i+1}, C_i \qquad (8)$$

The mobile agent of server E asks server B to sign the data with its private key and to calculate a new checksum $C_{i+1}$ and to give it back to the mobile agent which then returns back to server E which can be described as follows:

$$B \Rightarrow E: PE, C_{i+1} = \{C_i, [X_{i+1}]PKB, B\}KE \qquad (9)$$

wherein PE is the program code of the mobile agent of server E, PKB is the private key of server B, KE is the public key of server E, $C_{i+1}$ and $C_i$ are the respective checksums and $X_{i+1}$ are the data server E wants to add at the i+1'th position.

That means that server E sends its mobile agent to server B in order to let server B add the message $X_{i+1}$ to the data container. When the mobile agent gets back home to server E, server E decrypts the checksum with its private key and encrypts it again with the public key from server $S_0$. Server E can in this way continue until it is satisfied with the result. Then it can release the mobile agent from server $S_0$ with the forged data container and send it back to server $S_0$ which can be described as follows:

$$E \Rightarrow S_0: PS_0, C_{i+1} = \{C_i, [X_{i+1}]PKB, B\}KS_0 \qquad (10)$$

wherein $PS_0$ is a program code of the mobile agent from server $S_0$, $KS_0$ is the public key of server $S_0$, and $C_{i+1}$ and $C_i$ are the respective checksums. Server $S_0$ has no possibility to detect the malicious behavior of server E.

In the following, two possible methods are described generally, wherein each method meets one of the above mentioned problems, respectively.

In order to make sure that one can check if the data the agent is carrying with it are really this agent's data and do not belong to another agent, a method as proposed in European Patent application number 06 290 878.5 can be provided, the method comprising at least the following operations:
choosing a unique number and assigning it to the mobile agent,
choosing a secret symmetric key and assigning it to the data to be protected,
encoding the secret key with the second server's public key,
encrypting the secret key and the first server's public key via a wrapping function, thus forming a data authentication code,
encoding the data with a secret key, and
combining the unique number, the encoded data, the encoded secret key and the data authentication code and encoding that combination with the first server's private key, thus forming a nested structure to be decoded successively for access to the data.

According to a possible embodiment of the method, the nested structure to be decoded for access to the data is defined as follows:

$$[PA, r0, \{SKo\}KB, h(KA, SKo), \{mB\}SKo]PKA \qquad (11)$$

wherein PA is a agent's program code, r0 is the unique number, SKo is the secret key, KB is the second server's public key, h is the wrapping function, such as a hash function, KA is the first server's public key, PKA is the first server's private key and mB is the data to be protected.

Coming back to the exemplary attack mentioned before, the same scenario can be described and the attack as described before can be avoided by means of the method according to a possible implementation as follows:

When the mobile agent arrives at a server of user B, user B verifies first the private key associated with the mobile agent, representing at the same time a signature from a user A as the owner of the mobile agent on the whole data structure which has been received by the server of user B. Then user B decrypts the secret symmetric key, called here SKo, with its private key, called here PKB. Then user B checks the message authentication code, that means the hash function value h of the public key KA from user A, namely the public key associated with the mobile agent, and the secret symmetric key SKo. Finally user B decrypts the message mB and makes it available to the mobile agent, if appropriate.

The attack described before is not possible anymore since user E does not know the secret symmetric key SKo and cannot forge the hash value h(KA, SKo). User E can remove again the signature of user A, namely the private key PKA associated with the mobile agent and can replace it by its own private key PKE. Furthermore, user E can replace the mobile agent code of user A by the mobile agent code of its own agent represented by PE. Therefore, user E can send to user B the following:

$$E \Rightarrow B:[PE,r0,\{SKo\}KB,h(KA,SKo),\{mB\}SKo]PKE \quad (12)$$

Since the public key KA does not match with the private key PKE of user E with which user E signed the data structure, the verification of the hash function value h(KA, SKo) by user B will fail and user B will not decrypt the message mB and thus does not make it available to the mobile agent of user E.

According to a further possible embodiment of the method, the unique number is used only once and is calculated on the basis of a program code of the mobile agent. Therefore, the data structure contains a unique number, in the above-mentioned case called r0, that will be used only once and is calculated on the basis of the program code of the mobile agent, represented in the above mentioned case by PA. Every time a user sends out a new mobile agent the user changes that unique number. This number is introduced because if not, it could be possible that an old mobile agent of a specific user can be reused. If user A for example sends out a mobile agent to change data about him that are kept at user B, then someone would be able to reuse an old mobile agent of user A to change the data back into the old data.

It is possible that user B maintains a list of numbers that have already been used. Therefore, user B has a control that no number can be reused, and therefore, an already used agent cannot be reused again.

According to a further possible embodiment of the method, the program code of the agent is maintained in a Java Archive file. Furthermore, it is possible that that Java Archive file is signed by the private key associated with the mobile agent which is the private key of the mobile agent's owner.

It is also possible that the Java Archive file contains the unique number assigned to the mobile agent.

The complete structure to be decoded can be defined as follows:

$$[PA,r0]PKA+[r0,\{SKo\}KB,h(KA,SKo),\{mB\}SKo]PKA \quad (13)$$

wherein PA is an agent's program code, r0 is the unique number, SKo is the secret symmetric key, KB is the second server's public key, h is the wrapping function, KA is the first server's public key, PKA is the first server's private key and mB is the data to be protected. The reason why the Java Archive file may also contain the unique number is because the agent's program code and the value of the objects, i.e. the data of the mobile agent, can be serialized separately in existing agent platforms.

In order to meet the second problem, namely to add data that a mobile agent from a first server finds on a i'th server of a number of servers the mobile agent has to pass according to an appropriate succession to a secure data container, a method can be applied as proposed in another previous European Patent application number 06 290 876.9, the method comprising the following operations:

receiving the mobile agent which has been prepared by the first server by choosing a unique number and assigning it to the mobile agent, encoding the chosen unique number with the private key of the first server, thus forming an agent specific initialization number as basis for a sequence of checksums to be computed successively by the number of servers, and sending the mobile agent together with its initialization number on its route through the network system for processing the order passing thereby the number of servers successively, encoding in case that the mobile agent intends to take data with it when passing the i'th server the initialization number together with the data with the i'th server's private key and computing therewith a new server specific checksum using the public key of the first server and the checksum computed by the server right before in the succession, and sending the mobile agent further to the next server within the succession.

According to a possible embodiment of the method the data the mobile agent takes with it from servers on its route through the network is encoded by the public key of the first server. Thereby, it can be avoided that the data remains visible to other servers when the mobile agent is on its route through the network system.

Furthermore, it is possible that the sequence of checksums is defined by the following functional rule:

$$C_i = \{C_{i-1}, [X_i, [r0]PKS_0]PKS_i, S_i\}KS_0 \quad (14)$$

wherein $C_i$ is the i'th checksum, $X_i$ is the data from the i'th server, r0 is the unique number, $PKS_0$ is the private key of the first server, $KS_0$ is the public key of the first server, $PKS_i$ is the private key of the i'th server, $S_i$ is a code number of the i'th server, and i is a positive integer value.

It is assumed that the mobile agent has to pass for processing its order a succession of n servers $S_1, \ldots, S_n$, wherein n is a positive integer value. In the functional rule described above, i should be smaller or equal to n. r0 is the unique number which has not to remain secret. $[r0]PKS_0$ corresponds to a signature from the first server from which the mobile agent is sent out.

Coming back to the exemplary attack mentioned before, the same scenario can be described and the attack as described before can be avoided by means of an implementation as follows:

When a mobile agent wants to take data with it from a certain server $S_i$, the new checksum $C_i$ is, as already described, the following:

$$C_i = \{C_{i-1}, [X_i, [r0]PKS_0]PKS_i, S_i\}KS_0 \quad (15)$$

It is clear that the previously described attack is not possible anymore. It is supposed again that server E gets the mobile agent from the first server $S_0$ and that server E knows an old value of the checksum $C_i$ with i<n. This is possible, as already indicated before, if there is, for example, a loop in the route of the mobile agent or if server E collaborates with another server where the mobile agent already went. If server E uses the checksum $C_i$ and the unique number from server $S_0$ in its own mobile agent, then the unique number r0 gets signed with the private key of server E which is described by [r0]PKE. Server B which is asked by the mobile agent from server E to compute a new checksum by adding the data $X_{i+1}$ will determine the checksum as follows:

$$C_{i+1}=\{C_i,[X_{i+1},[r0]PKE]PKB,B\}KE \quad (16)$$

In the originally proposed method the data container was initialized with $\{N_0\}KS_0$ to be able to check in the end if the data container truly belonged to this respective mobile agent and to prevent a server of generating its own data container. This mechanism was flawed. By using the new computational rule for computing the checksum this can be avoided. When server E receives the checksum it replaces its public key KE by the public key $KS_0$ of the first server. Since the signature from server E, namely [r0]PKE is further signed by the private key PKB of server B when computing the new checksum $C_{i+1}$, and further server E does not know the private key of the first server, server E is not able to erase its private key PKE from the checksum, thus leaving a kind of fingerprint. Therefore, when server E sends the mobile agent from server $S_0$ together with the falsified data and the new checksum $C_{i+1}$ back to server $S_0$, server $S_0$ will immediately recognize that the data container is not part of its own mobile agent, but the data container of another agent. Finally, server $S_0$ can be sure that the data it gets by its own mobile agent have been tampered by any server on the mobile agent's route through the network.

It is possible that the unique number r0 which does not have to remain secret corresponds to a process identification number. That means that the chosen unit number can be at the same time associated to a specific order or process the mobile agent has to execute on its route through the network.

It is also possible that each checksum is deflated for verifying successively the respective keys on the data thus checking the unaffected and correct processing of the order.

Apart from such provisions in order to prevent the above mentioned kinds of attacks, it may further be necessary to provide a mechanism that guarantees that a certain number of previously defined servers are being visited by the mobile agent on its route through a corresponding network system. Therefore, it would be appropriate to protect the path of a mobile agent.

Thereby, the following mechanism to protect the path of the mobile agent can be considered. Before the mobile agent is sent out from the first server $S_A$, the path of the mobile agent is encrypted in the following way:

$$r = \{ip(S_A),ip(S_2),[ip(S_A),ip(S_1),ip(S_2),t,\{...\}KS_2]PKS_A\}KS_1 \quad (17)$$

$$\{...\}KS_2 = \{ip(S_1),ip(S_3),[ip(S_1),ip(S_2),ip(S_3),t,\{...\}KS_3]PKS_A\}KS_2$$

...

$$\{...\}KS_{n-1} = \{ip(S_{n-2}),ip(S_n),[ip(S_{n-2}),ip(S_{n-1}),ip(S_n)t,\{...\}KS_n]PKS_A\}KS_{n-1}$$

$$\{...\}KS_n = \{ip(S_{n-1}),End,[ip(S_{n-1}),ip(S_n),End,t,\{...\}KS_3]PKS_A\}KS_n$$

wherein $ip(S_i)$ is the ip-address of server $S_i$, t is a unique number, and "End" denotes the end of the path of the mobile agent.

Thus, the path contains the encrypted addresses of the servers that the mobile agent will visit and digital signatures to protect the integrity of the path. The path is encrypted in a nested format.

When the mobile agent arrives at server $S_i$, server $S_i$ decrypts the internet addresses of its predecessor $ip(S_{i-1})$ and of its successor $ip(S_{i+1})$, the digital signature and the rest of the encrypted path that now becomes the new data structure of the route.

The digital signatures are calculated based on a unique number t, this is necessary to prevent replay attacks. They also contain the ip-addresses of the current server $S_i$, of the previous server $S_{i-1}$ and the next server $S_{i+1}$. The rest of the path is also signed.

Based on "End" the server $S_n$ can decide if it is the endpoint of the path. Thus, "End" is a configuration value. Mostly, the mobile agent will return to the first server where the mobile agent departed. The digital signatures are included in the encrypted part, to keep the path secret.

By encrypting the path in a nested format, the following attack can be prevented. Thereby, it is assumed that the original path of the mobile agent contains two servers $S_i$ and $S_j$, that are not located one immediately after the other (i.e., j>i+1). Then the server $S_i$ can send a copy of the path to $S_j$ when the mobile agent is located on the server $S_i$. The server $S_j$ can check so far if it is in the path of the mobile agent by trying to decrypt with his private key in a sequential way the data of the path. If in one of the attempts it is capable of obtaining the cleartext, then server $S_j$ knows that it is in the path. In this case server $S_j$ informs server $S_i$ about this, and server $S_i$ can then send the mobile agent immediately to server $S_j$, whereby the servers between $S_i$ and $S_j$ are not visited by the mobile agent. No server after $S_j$ can detect this kind of attack.

By using the nested format as described before, this kind of attack is not possible anymore, because the path is calculated one step at a time. Because of the nested encryption of the path the servers have to be visited in the right order. In each step the address of the following server is decrypted and the remaining information of the path is still encrypted with the public key of the next server. If the verification of the signature by server $S_i$ is successful, $S_i$ can be certain that it was included in the original path, that the mobile agent comes from the correct predecessor, that the address of the following server $S_{i+1}$ is correct and that all further data in the path cannot be changed.

An attack that cannot be prevented by this scheme is the following. A server $S_i$ can send information about a mobile agent, for example its identity, to all servers that are cooperating with that server $S_i$. If the mobile agent later on by coincidence arrives at one of these servers, then the mobile agent can be resetted to its old state when it still was at server $S_i$ and bypassed all the servers in between, as described before. Server $S_i$ has to save a copy of the mobile agent, however, in order to reuse it later on.

SUMMARY

Therefore, it would be appropriate to provide a method to prevent all of the previously described attacks at once.

According to one aspect, a method is provided for protecting data and path of a mobile agent from a first server within a network system with a plurality of servers, at least a number of which the mobile agent has to pass according to an appropriate succession which defines the path of the mobile agent, wherein the path and data intended for any one of the servers are jointly encrypted within a nested structure, the nested structure being built up on a number of nested terms corresponding to the number of servers, each nested term being decryptable in the given succession by exactly one server of the number of servers in such a manner that each server of the numbers of servers gets access only to the data intended for it and to a section of the path enclosing it, respectively.

It is possible that the method wherein each of the plurality of servers has a pair of a public key and a private key and an ip-address, respectively, comprises, starting from the first server, at least the following operations:

choosing a unique number and assigning it to the mobile agent, choosing for each server the mobile agent has to pass a secret symmetric key, respectively, and assigning it to that respective server, encoding each secret key with the public key of the respective server, encrypting each secret key and the public key of the first server via a wrapping function, thus forming for each respective server an authentication code, encoding via a recursive workflow the data and the path jointly in a nested structure consisting of a number of nested terms corresponding to the number of servers, the workflow starting by encoding as kernel of the innermost term the data intended for the last server in the succession with the last server's secret key, combining the unique number, that innermost term's kernel, the encoded respective secret key, the respective data authentication code and the ip-address of the last server and the ip-address of the second last server and encoding that combination with the private key of the first server, thus forming the innermost term and serving combined with the ip-address of the last server and the data intended for the second last server as kernel of the second innermost term in the nested structure, and continuing accordingly by generating successively the terms of the nested structure correspondingly to the innermost term.

It is possible that the wrapping function is chosen as a hash function.

In another aspect, each of the nested terms to be decoded by the respective server for access to the respective data is defined according to the following scheme:

$$Data\_S_i = [r0, ip(S_{i-1}), ip(S_i), \{S_iKo\}KS_i, h(KS_0, S_iKo), \{m'_i\}S_iKo]PKS_0$$

wherein r0 is the unique number, $S_iKo$ is the respective server's secret key, $KS_i$ is the respective server's public key, h is the wrapping function, $KS_0$ is the first server's public key, $PKS_0$ is the first server's private key and $m'_i$ is the i'th term of the nested terms which is defined as follows:

$$m'_i = m_i, ip(S_{i+1}), Data\_S_{i+1}$$

wherein i is a positive integer value, $m_i$ is the data intended for the i'th server $S_i$.

The data of the nested path scheme is added hereby to the other data that are targeted to the different servers on the path. The unique number t, which has already been introduced before, corresponds to the unique number r0.

Thus, the mechanism to protect the data of the mobile agent becomes now a nested data structure.

According to a further aspect, the unique number is used only once and is calculated on basis of a program code of the mobile agent.

It is also possible that the program code of the mobile agent is maintained in a Java Archive file.

The Java Archive file can be signed by the first server's private key.

Furthermore, the Java Archive file can contain the unique number assigned to the mobile agent.

Moreover, the agent's program code and the data of the agent can be serialized separately.

In another aspect, the unique number can be used by the servers for registration in a list of numbers, thus keeping a check on the numbers that have already been used.

In another implementation, the method further comprises, starting from the first server, the following operations:

choosing a unique number and assigning it to the mobile agent, encoding the chosen unique number with the private key of the first server, thus forming an agent specific initialisation number as basis for a sequence of checksums to be computed successively by the number of servers, and sending the mobile agent together with its initialisation number on its route through the network system passing thereby the number of servers successively, so that each server when being passed by the mobile agent encodes the initialisation number together with data to be added at that respective server with that server's private key and computes therewith a new server specific checksum using the public key of the first server and the checksum computed by the server right before in the succession, and sends the mobile agent together with the new checksum further to the next server within the succession.

In one possible aspect, the sequence of checksums is defined by the following functional rule:

$$C_i = \{C_{i-1}, [X_i[r0]PKS_0]PKS_i, S_i\}KS_0$$

wherein $C_i$ is the i'th checksum, $X_i$ is the data to be added at the i'th server, r0 is the unique number, $PKS_0$ is the private key of the first server, $KS_0$ is the public key of the first server, $PKS_i$ is the private key of the i'th server, $S_i$ is a code number of the i'th server, and i is a positive integer value.

It is possible that the unique number is a process identification number.

According to another implementation, each checksum is used to be deflated by the first server for verifying successively the respective keys on the data thus checking the unaffected completion of the full path when the mobile agent returns back to the first server.

In another aspect, a system is provided which comprises at least a first server and a mobile agent from said first server, the first server having a pair of a private key and a public key and an ip-address, the system is further coupled with a plurality of servers, at least a number of which the mobile agent has to pass according to an appropriate succession which defines a path of the mobile agent, wherein each of the plurality of servers has a pair of a public key and a private key and an ip-address, respectively, and the mobile agent is configured to provide its path and data intended for any one of the servers jointly within a nested structure, the nested structure being built up on a number of nested terms corresponding to the number of servers.

It is possible that the nested structure can be computed by the first server which sends the mobile agent out.

In a possible aspect, each of the nested terms to be decoded by the respective server for access to the respective data is defined according to the following scheme:

$$Data\_S_i = [r0, ip(S_{i-1}), ip(S_i), \{S_iKo\}KS_i, h(KS_0, S_iKo), \{m'_i\}S_iKo]PKS_0$$

wherein i is a positive integer value, r0 is a unique number, $ip(S_i)$ and $ip(S_{i-1})$ are the respective ip-addresses of servers $S_i$ and $S_{i-1}$, respectively, $S_iKo$ is a respective server's secret key, $KS_i$ is the respective server's public key, h is a wrapping function, $KS_0$ is the first server's public key, $PKS_0$ is the first server's private key, and $m'_i$ is the i'th term of the nested terms, which is defined as follows:

$$m'_i = m_i, ip(S_{i+1}), Data\_S_{i+1}$$

wherein $ip(S_{i+1})$ is the respective ip-address of server $S_{i+1}$, and $m_i$ is the data intended for the i'th server $S_i$.

It is possible that the unique number is used only once and is calculated on the basis of a program code of the mobile agent. The program code of the mobile agent can be maintained in a Java Archive file. Thereby, the Java Archive file can be signed, as already mentioned, by the first server's private key. Moreover, the Java Archive file can contain the unique number assigned to the mobile agent.

According to another implementation, the agent's program code and the data of the mobile agent are serialized separately.

According to a further aspect, each of the plurality of servers is configured to receive the mobile agent which has been prepared by the first server by encoding the chosen unique number with the private key of the first server, thus forming an agent specific initialisation number as basis for a sequence of checksums to be computed successively by the number of servers, and sending the mobile agent together with its initialisation number on its route passing thereby the number of servers successively, to encode when being passed the initialisation number together with data to be added at said server with said server's private key and to compute therewith a new server specific checksum using the public key of the first server and the checksum computed by the server right before in the succession, and to send the mobile agent further to the next server within the succession.

It is possible that the sequence of checksums is defined by the following functional rule:

$$C_i = \{C_{i-1}, [X_i, [r0]PKS_0]PKS_i, S_i\}KS_0$$

wherein $C_i$ is the i'th checksum, $X_i$ is the data to be added at the i'th server, r0 is the unique number, $PKS_0$ is the private key of the first server, $KS_0$ is the public key of the first server, $PKS_i$ is the private key of the i'th server, $S_i$ is a code number of the i'th server, i is a positive integer value.

In another aspect, a computer program product is provided with a computer-readable medium and a computer program stored on the computer-readable medium with a program code which is suitable for carrying out a method for protecting data and path of a mobile agent from a first server as described before when the computer program is run on a computer.

Another implementation provides a computer program with a program code which is suitable for carrying out a method for protecting data and path of a mobile agent from a first server as described before when the computer program is run on a computer.

A computer-readable medium with a computer program stored thereon is also provided, the computer program comprising a program code which is suitable for carrying out a method for protecting data and path of a mobile agent from a first server as described before when the computer program is run on a computer.

Implementations can be used in an e-business scenario for travel management for example on top of a so-called SAP NetWeaver™ platform. When someone wants to plan a trip, he first checks the web pages of some airline companies for the price of a flight, to pick the cheapest one out. Besides that airplane ticket one would also need to rent a car and a hotel for the trip. In reality, most airline companies have special deals with hotels and car rental services. The check for the cheapest combination of an airplane ticket, hotel and car rental is very time consuming for most people. By using a mobile agent, it is possible to automate this search. It is needed a mobile agent that carries the data of the trip with it and looks on the different agent-enabled SAP NetWeaver™ platforms for the needed information. Data that are sensitive for customers can now be protected by using an embodiment of the method, or by using an embodiment of the mobile agent. Data which are sensitive for customers can be for example credit card information, fidelity numbers, etc.

Further features and embodiments will become apparent from the description and the accompanying drawings.

For the purpose of clarity, the present discussion refers to an abstract example of a network system. However, implementations of the method and the system may operate with a wide variety of types of network systems including networks and communication systems dramatically different from the specific example as illustrated in the following drawings.

It should be understood that while details of one or more implementations are described in terms of a specific system, further implementations may have applications in a variety of communication systems, such as advanced cable-television systems, advanced telephone-networks or any other communication systems that would benefit from the system or the method. It is intended that the system as used in this specification and claims is realizable within any communication system unless the context requires otherwise.

Implementations are schematically illustrated in the drawings by way of an example embodiment and explained in detail with reference to the drawings. It is understood that the description is in no way limiting and is merely an illustration of various implementations.

BRIEF DESCRIPTION OF THE DRAWINGS

FIG. 1 shows a possible scheme for protection of a path of a mobile agent which may be vulnerable to an attack as it is known from the prior art.

FIG. 2 shows a possible scheme for protection of the path of a mobile agent as it can be realized by a possible embodiment of a method according to one implementation.

DETAILED DESCRIPTION

Figure 3:
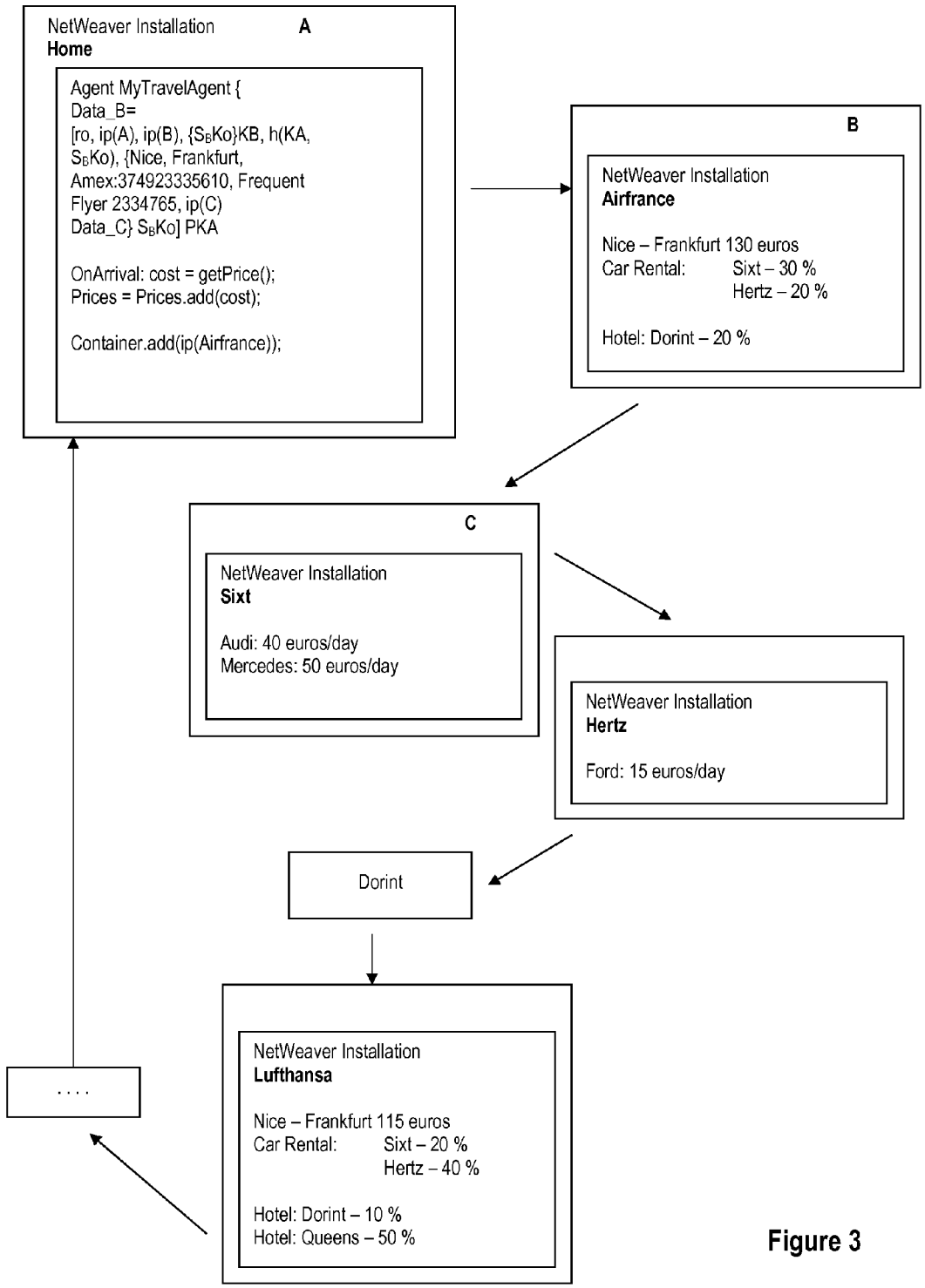
FIG. 3 shows an e-business scenario in which an embodiment of a method according to another implementation can be used.

FIG. 1 shows a mechanism to protect a path of a mobile agent as it is already known in the prior art. Before a mobile agent is sent, the path of the mobile agent is encrypted according to the formula as shown in FIG. 1. The encrypted path r has a nested structure, consisting of nested terms. The number of nested terms corresponds to the number of servers $S_i$ which are to be visited by the mobile agent on its route. The mobile agent MA is sent out from a server $S_0$. The server $S_0$ has a private key $PKS_0$ and a corresponding public key $KS_0$. Furthermore, the server $S_0$ has an ip-address $ip(S_0)$. Each server $S_i$ of the number of servers also has a private key $PKS_i$, a corresponding public key $KS_i$ and an ip-address $ip(S_i)$. t is a unique number. "End" denotes the end of the path of the mobile agent MA.

Therefore, the encrypted path r contains the encrypted ip-addresses of the respective servers that the mobile agent will visit. Thereby, the path determines a specific order according to which the servers are to be visited by the mobile agent. Moreover, the encrypted path r comprises digital signatures to protect the integrity of the path of the mobile agent.

When the mobile agent MA arrives at a server $S_i$, the encrypted path has already been partly decrypted by the servers $S_j$, $j=1, \ldots, i-1$, which have already been visited by the mobile agent as determined by the path itself. Therefore, the term to be decrypted by server $S_i$ can be described as follows:

$$\{\ldots\}KS_i = \{ip(S_{i-1}), ip(S_{i+1}), [ip(S_{i-1}), ip(S_i), ip(S_{i+1}), t, \{\ldots\}KS_{i+1}]PKS_0\}KS_i$$

Therefore, $S_i$ can decrypt by means of its private key $PKS_i$ the ip-address $ip(S_{i-1})$ of its predecessor $S_{i-1}$ and the ip-address $ip(S_{i+1})$ of its successor $ip(S_{i+1})$. Moreover, it can decrypt the digital signature, thus, getting to know the data structure $ip(S_{i-1}), ip(S_i), ip(S_{i+1}), t, \{\ldots\}KS_{i+1}$. However, the portion $\{\ldots\}KS_{i+1}$, remains encrypted and becomes the new data structure of the route, i.e. of the remaining path.

The signatures are calculated based on the unique number t in order to prevent replay attacks. The signatures also contain the ip-address of the current server $S_i$, the previous server $S_{i-1}$ and the next server $S_{i+1}$. Based on "End", server $S_n$ can decide if it is the endpoint in the path. Mostly, the mobile agent will return to the server $S_0$ where the mobile agent departed. The signatures are included in the encrypted part, to keep the path secret.

Because of the nested encryption of the path the servers have to be visited in the right order. If the verification of the signature by server $S_i$ is successful, $S_i$ can be certain that it was included in the original path, that the mobile agent MA comes from the correct predecessor $S_{i-1}$, that the address of the following server $S_{i+1}$ is correct and that all further data in the path cannot be changed.

However, an attack that cannot be prevented by this scheme is described in the following. A server $S_i$ can send information about an agent, for example its identity, to all servers that are cooperating with server $S_i$. If the agent later on, by coincidence, arrives at one of these servers, then the mobile agent MA can be reset to its old state as if the mobile agent were still at server $S_i$ and bypassed all the servers in between. That means, e.g. that all data the mobile agent actually took with it since it departed from server $S_i$ would be lost. For this purpose server $S_i$ has to save a copy of the mobile agent MA in order to reuse it later on.

FIG. 2 describes a scheme to protect a path of a mobile agent according to a possible embodiment of a method according to one aspect. In order to protect the path of the mobile agent, the principle of nested encryption is used. This approach is combined with a mechanism to protect data of the mobile agent as described in the European Patent application number 06 290 878.5.

The data of the path and the data that are targeted to different servers on the path of the mobile agent are jointly encrypted within a nested structure which can be presented by the formula as shown in FIG. 2. All data of the mobile agent as well as the path the mobile agent intends to trace are protected in one go. The ip-addresses used to describe the path and the data represented by $m_i$ are coupled and appropriately encrypted.

When the mobile agent MA arrives at server $S_i$, server $S_i$ verifies first the private key, namely the signature from server $S_0$ on the whole data structure. Then server $S_i$ decrypts the secret symmetric key $S_iKo$ with its private key $PKS_i$. Then server $S_i$ checks the message authentication code, namely the hash value h of the public key $KS_0$ from server $S_0$ with the secret symmetric key $S_iKo$. Finally server $S_i$ decrypts the data $m'_i$ and makes it available to the mobile agent MA if appropriate. Thereby, the ip-address of the following server $S_{i+1}$ as well as the data $m_i$ which is targeted to server $S_i$ becomes available. From Data_$S_{i+1}$, which is also comprised within $m'_i$, server $S_i$ gets no more information since $S_i$ has no access to the secret key $S_{i+1}Ko$. Therefore, server $S_i$ cannot see the full path or all data of the mobile agent. The fact that no server on the path of the mobile agent can see the full path that the mobile agent should follow can be convenient with respect to privacy of information.

In order to prevent that server $S_i$ can send information about the mobile agent to all servers that are cooperating with server $S_i$ so that those servers can reset the mobile agent when the mobile agent arrives at one of these servers, it can be further foreseen to add the data to the mobile agent in a secure way as proposed in European Patent application number 06 290 876.9. The introduction of a checksum can be used in order to guarantee that any undesirable intervention of a server can be detected. Such a checksum which has to be computed by each server $S_i$ that the mobile agent visits on its path and which is given to the mobile agent to take with it on its further route can be defined by the following functional rule:

$$C_i = \{C_{i-1}, [X_i[r0]PKS_0]PKS_i, S_i\}KS_0$$

wherein $C_i$ is the i'th checksum, $X_i$ is the data to be added at the i'th server, r0 is the unique number, $PKS_0$ is the private key of the first server, $KS_0$ is the public key of the first server, $PKS_i$ is the private key of the i'th server, $S_i$ is a code number of the i'th server, and i is a positive integer value.

It can be envisaged that every time the mobile agent reaches a server $S_i$, the server $S_i$ has to add its identity at the least to the secure data container, even if no other data are collected at that server. This way it is possible to check when the mobile agent is back home if the mobile agent has completed its full path.

FIG. 3 shows a specific e-business scenario for a travel management on top of a so-called SAP NetWeaver™ platform. It is assumed that someone wants to plan a trip. In this case he first checks the web pages of some airline companies for the price of the flight he wants so he can pick out the cheapest one. In the case shown here the traveler constructs by means of server A as the Home server "Home" a mobile agent MA called here "MyTravelAgent". The data structure which is carried by the mobile agent MA corresponds here to:

Data_B=[r0,ip(A),ip(B){$S_B$Ko}KB,h(KA,$S_B$Ko),
{Nice,Frankfurt,Amex:374923335610,Frequent
Flyer 2334765,ip(C),Data_C}$S_B$Ko]PKA where r0 is a unique number, ip(A) is the ip-address of server A as the Home server, and ip(B) is the ip-address of a server B to which the mobile agent is sent first. In the case shown here server B corresponds to the server of the airline Airfrance. $S_B$Ko is a secret symmetric key which is assigned to and known by server B. KA is a public key and PKA a private key of server A as the home server of the traveler.

The mobile agent MA migrates now from one server to another in order to get enough information for the trip to be planned by the traveler. Besides an airplane ticket the traveler would also need to rent a car and a hotel for the trip. In reality most airline companies have special deals with hotels and car rental services. The check for the cheapest combination of airplane ticket, hotel and car rental is too time consuming for most travelers. By using the mobile agent MA the traveler can automate this search. The mobile agent MA looks now on its route through the network system on the different agent enabled SAP NetWeaver™ platforms for the needed information. The order of the servers which are to be visited by the mobile agent defines the path of the mobile agent which can be described by the respective ip-addresses of the servers. The path is also encompassed by the nested data structure Data_B. The data which is carried by the mobile agent MA and which should be not accessible to any server within the network is {Nice, Frankfurt, Amex: 374923335610, Frequent Flyer 2334765, ip(C), Data_C} since those data are sensitive for the traveler, particularly for example a credit card information and further fidelity numbers. This data can be partly decrypted by server B. First mobile agent MA starts from server A and is sent to server B. In order to get information about the request of the traveler, server B has to handle the data element Data_B accordingly. First server B can verify the digital signature of server A, namely the private key PKA by means of the public key KA. Then server B decrypts the secret symmetric key $S_B Ko$ with its private key PKB. By means of the secret symmetric key $S_B Ko$ server B can check the message authentication code, namely the hash value h of the public key KA of server A. Finally server B decrypts the data {Nice, Frankfurt, Amex: 374923335610, Frequent Flyer 2334765, ip(C), Data_C} by means of the secret symmetric key. Thereby server B gets to know that the traveler wants to book a flight from Nice to Frankfurt, that his Amex number is 374923335610, and that the traveler is the frequent flyer 2334765. Moreover, due to the ip-address ip(C), server B gets to know the next server the mobile agent has to visit. Besides the information server B needs to give any further information about the request of the traveler, namely about the flight from Nice to Frankfurt, server B also gets to know the ip-address of the next server C to which the mobile agent is to be sent next. In the case shown here server C corresponds to the server of the car rental company Sixt. The rest of the path the mobile agent has to trace is included in the encrypted data element "Data_C". The data element Data_C is not further decryptable by server B. This element is structured comparably as the data element "Data_B" decryptable by server B. Therefore, regarding the whole path of the mobile agent, there results a nested data structure. Data_C is partly decryptable by server C so that server C gets information targeted to it in order to contribute in processing the request of the traveler.

From server B as the server of the airline company Airfrance, the traveler gets some information about a price of a flight from Nice to Frankfurt which is about 130 euros and further information about special deals the airline Airfrance has with the hotel Dorint and with car rental services Sixt and Hertz.

Then the mobile agent MA migrates further to server C as the server of the car rental service Sixt. The data element Data_C can further be handled by server C. The traveler gets here information about different cars and the corresponding rental costs, namely about Audi which costs 40 euros per day and Mercedes which costs 50 euros per day. The mobile agent MA collects all this information and migrates further to the server of the car rental service Hertz where it gets the information about the rental costs of Ford which costs 15 euros per day. With all this collected information the mobile agent MA travels further to the server of the hotel Dorint in order to get now the complete information for a trip when it is made by using the airline Airfrance and one of the hotels and car rental services with which the airline company Airfrance has special deals.

In order to get information about an alternative airline company, the mobile agent travels further through the network to the server of the airline company Lufthansa. On this server it gets information about the flight from Nice to Frankfurt which costs about 115 euros. The Lufthansa company has a deal with the car rental services Sixt and Hertz and with the hotels Dorint and Queens. The mobile agent MA can get now more information on the respective servers of the car rental services and the hotels in order to get a complete statement of costs for the traveler when either using the airline company Airfrance or the airline company Lufthansa. Finally, the mobile agent MA returns back to server A with a detailed catalogue of statements of costs about different alternatives for planning the trip from Nice to Frankfurt. In order to avoid that the mobile agent MA is vulnerable to so-called cut-and-paste attacks when the mobile agent MA migrates from one server to another its path as well as the data it carries with it, particularly the sensitive data of the traveler, as for example the credit card information and further fidelity numbers, are protected as proposed by term Data_B. Thus, no unauthorized server can get access to the sensitive data of the traveler. Furthermore, no server can see the full path that the mobile agent should follow. This can be quite convenient with respect to privacy of information.

Figure 4:
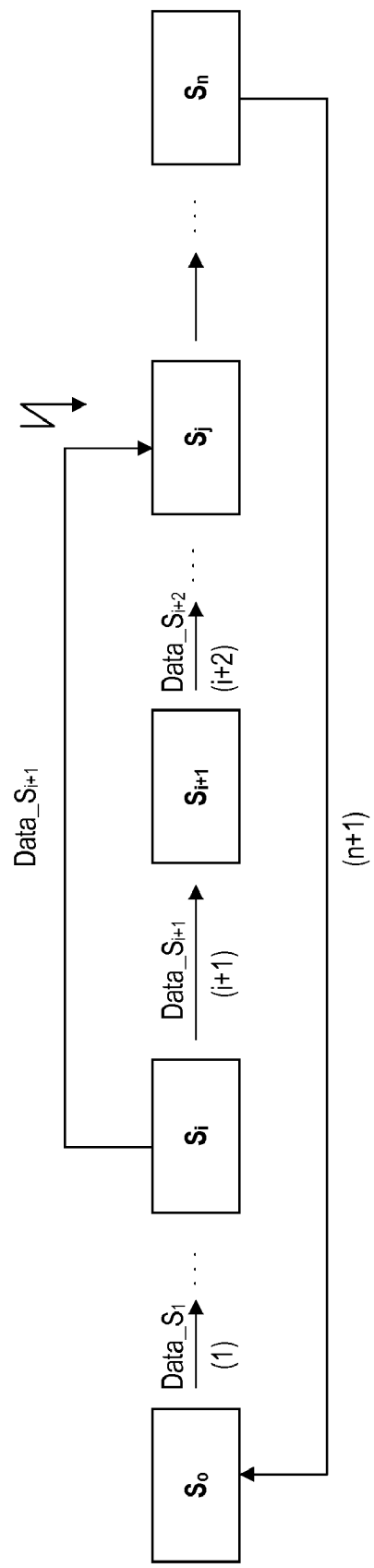
FIG. 4 shows a possible scenario of a data transfer by a mobile agent as it can be realized within a possible embodiment of a system according to one implementation.

FIG. 4 shows a possible scenario of a data transfer by a mobile agent as it can be realized within a possible embodiment of the system according to one implementation. The scenario shown in FIG. 4 shows a plurality of servers $S_0, \ldots, S_n$ which are to be passed by a mobile agent according to a pregiven succession. That succession can be pregiven by the first server $S_0$ which sends the mobile agent out. This succession defines the path the server has to follow on its route through the network. In the case shown here it is assumed that the mobile agent has to pass the individual servers in an ascending order indicated by their respective index. It is further assumed that each of the servers of the plurality of servers has a private key and a public key and an ip-address, respectively. That means that server $S_i$ has a public key $KS_i$ and a private key $PKS_i$ and an ip-address $ip(S_i)$. The same applies to all the other servers indicated by the corresponding index, respectively. Before sending the mobile agent on its way from server $S_0$ to the next server $S_1$, server $S_0$ composes the path of the mobile agent and data intended for anyone of the servers in a nested format according to the following scene:

Data_$S_1$=[r0,ip($S_0$),ip($S_1$),{$S_1$Ko}$KS_1$,h($KS_0$,$S_1$Ko),
{m'$_1$}$S_1$Ko]$PKS_0$, wherein m'$_1$=m$_1$, ip($S_2$), Data_$S_2$, r0 is an arbitrary unique number, $S_1$Ko is a secret symmetric key assigned to server $S_1$, h is a cryptographic hash function, and m$_1$ describes the data intended for server $S_1$.

When the mobile agent arrives for example at server $S_i$ after having passed all servers $S_1, \ldots, S_{i-1}$, server $S_i$ verifies first the private key, namely the signature from server $S_0$ on the whole data structure Data_$S_i$. Then server $S_i$ decrypts the secret symmetric key $S_i$Ko with its private key $PKS_i$. Then server $S_i$ checks the message authentication code, namely the hash value of the public key $KS_0$ from server $S_0$ with the secret symmetric key $S_i$Ko. Finally server $S_i$ decrypts the data m'$_i$ and makes it available to the mobile agent. The mobile agent therefore has access to the data m$_i$ intended for server $S_i$. Furthermore, the mobile agent gets to know the ip-address of server $S_{i+1}$ which the mobile agent has to visit next according to the pregiven succession. Data_$S_{i+1}$ is the encrypted data the mobile agent has to take with it on its further path to the next server $S_{i+1}$.

It is assumed, in the following, that server $S_i$ sends the mobile agent not to the next server $S_{i+1}$ but to a server $S_j$, wherein j>i+1. It will be shown in the following that server $S_j$ is not able to get access to the information the mobile agent takes with it. When the mobile agent arrives at server $S_j$ directly from server $S_i$, the mobile agent takes with it the data structure Data_$S_{i+1}$ as described in FIG. 4. The server $S_j$ can decode by means of the public key of server $S_0$ the signature of server $S_0$, but server $S_j$ is not able to get access to the secret symmetric key $S_{i+1}Ko$, since server $S_j$ does not know the private key of server $S_{i+1}$. Therefore, server $S_j$ only gets to know the ip-addresses of server $S_i$ and server $S_{i+1}$, but no information about the data the mobile agent takes with it, since this data is further encrypted within the term $m'_{i+1}$. Therefore, server $S_j$ has no effective benefit from the mobile agent. Server $S_j$ is not able to exert influence on the mobile agent's path and the data the mobile agent takes with it since the path as well as the data are encrypted jointly within the nested structure as described in FIG. 4.

In order to avoid that any server, which gets to know the identity of the mobile agent from another server, can reset the mobile agent to an older state when it still was at a previous server and bypassed all the servers in between, it can be foreseen that every server within the succession the mobile agent has to pass has to add its identity at the least to the secure data container by means of the mechanism of checksums as described before. Thus, one can check when the mobile agent is back home, if the mobile agent has completed its full path.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for protecting data and a path of a mobile agent (MA) from a first server within a network system having a plurality of servers $(S_0, S_1, \ldots, S_n)$, wherein the mobile agent has to pass a number of the servers according to an appropriate succession that defines the path of the mobile agent, the method comprising: jointly encrypting the path and data intended for any one of the servers within a nested structure, the nested structure being built up on a number of nested terms corresponding to the number of servers, each nested term being decryptable by exactly one server of the number of servers in such a manner that each server of the number of servers gets access only to the data intended for it and to a section of the path, respectively; and sending the mobile agent through the path,
wherein each of the plurality of servers has a pair of a public key $(KS_0, \ldots, KS_i, \ldots, KS_n)$ and a private key $(PKS_0, \ldots, PKS_i, \ldots, PKS_n)$ and an ip-address $(ip(S_0), ip(S_1), \ldots, ip(S_n))$, respectively, the method further comprising:
choosing a unique number (r0) and assigning it to the mobile agent;
choosing for each server the mobile agent has to pass a secret symmetric key $(S_iKo)$, respectively, and assigning $S_iKo$ to that respective server $(S_i)$;
encoding each secret key $(S_iKo)$ with the public key $(KS_i)$ of the respective server $(S_i)$;
encrypting each secret key $(S_iKo)$ and the public key $(KS_0)$ of the first server via a wrapping function (h), thus forming for each respective server $(S_i)$ an authentication code $(h(KS_0, S_iKo))$; and
encoding via a recursive workflow the data and the path jointly in a nested structure consisting of a number of nested terms corresponding to the number of servers, the workflow starting by encoding as kernel of an innermost term the data $(m_n)$ intended for a last server $(S_n)$ in the succession with the last server's secret key ($S_n$Ko), combining the unique number (r0), the innermost term's kernel ($\{m_n\}S_n$Ko), an encoded respective secret key ($\{S_n$Ko$\}KS_n$), a respective data authentication code (h($KS_0$, $S_n$Ko)) and an ip-address (ip($S_n$)) of the last server ($S_n$) and an ip-address (ip($S_{n-1}$)) of the second to last server ($S_{n-1}$) and encoding that combination with the private key ($PKS_0$) of the first server ($S_0$), thus forming the innermost term and serving, combined with the ip-address of the last server and the data intended for the second to last server, as kernel of a second innermost term in the nested structure, and continuing accordingly by generating successively the terms of the nested structure correspondingly to the innermost term.

2. The method according to claim 1, wherein the wrapping function is chosen as a hash function.

3. The method according to claim 1, wherein each of the nested terms to be decoded by the respective servers for access to the respective data is defined according to:

$$\text{Data\_}S_i=[r0,ip(S_{i-1}),ip(S_i),\{S_iKo\}KS_i,h(KS_0,S_iKo),\{m'_i\}S_iKo]PKS_0$$

wherein r0 is the unique number, $S_i$Ko is the respective server's secret key, $KS_i$ is the respective server's public key, h is the wrapping function, $KS_0$ is the first server's public key, $PKS_0$ is the first server's private key and $m'_i$ is the i'th term of the nested terms which is defined as follows:

$$m'_i=m_i,ip(S_{i+1}),\text{Data\_}S_{i+1}$$

wherein i is a positive integer value, $m_i$ is the data intended for the i'th server $S_i$.

4. The method according to any one of claim 1, wherein the unique number (r0) is used only once and is calculated based on a program code (PA) of the mobile agent (MA).

5. The method according to claim 4, wherein the agent's program code (PA) and the data of the agent are serialized separately.

6. The method according to claim 4, wherein the program code (PA) of the mobile agent (MA) is maintained in a Java Archive file (JAR).

7. The method according to claim 6, wherein the Java Archive file (JAR) is signed by the first server's private key ($PKS_0$).

8. The method according to claim 6, wherein the Java Archive file (JAR) contains the unique number (r0) assigned to the mobile agent (MA).

9. The method according to claim 1, further comprising using the unique number (r0) by the servers ($S_i$) for registration in a list of numbers, thus keeping a check on the numbers that have already been used.

10. The method according to claim 1, wherein each of the plurality of servers has a pair of a public key ($KS_0, \ldots, KS_i, \ldots, KS_n$) and a private key ($PKS_0, \ldots, PKS_i, \ldots, PKS_n$) associated therewith, respectively, the method further comprising:

choosing a unique number (r0) and assigning it to the mobile agent (MA);

encoding the chosen unique number (r0) with the private key ($PKS_0$) of the first server ($S_0$), thus forming an agent specific initialisation number ($C_0$) as a basis for a sequence of checksums ($C_o, \ldots, C_i, \ldots, C_n$) to be computed successively by the number of servers ($S_0, S_1, \ldots, S_n$); and sending the mobile agent together with its initialisation number ($C_0$) on its route through the network system passing thereby the number of servers ($S_0, S_1, \ldots, S_n$) successively, so that each server when being passed by the mobile agent encodes the initialisation number ($C_0$) together with data ($X_i$) to be added at that respective server with that the respective server's private key ($PKS_i$) and computes therewith a new server specific checksum ($C_i$) using the public key ($KS_0$) of the first server ($S_0$) and a checksum ($C_{i-1}$) computed by a server ($S_{i-1}$) right before in the succession, and sends the mobile agent together with the new server specific checksum ($C_i$) further to a next server ($S_{i+1}$) within the succession.

11. The method according to claim 10, wherein the data to be added at any of the number servers is encoded by the public key ($KS_0$) of the first server ($S_0$).

12. The method according to claim 10, wherein the data the mobile agent gathers on its route through the network when processing the order are collected within a data container.

13. The method according to claim 10, wherein the sequence of checksums is defined by a functional rule:

$$C_i=\{C_{i-1},[X_i,[r0]PKS_0]PKS_i,S_i\}KS_0$$

wherein $C_i$ is the i'th checksum, $X_i$ is the data to be added at the i'th server, r0 is the unique number, $PKS_0$ is the private key of the first server, $KS_0$ is the public key of the first server, $PKS_i$ is the private key of the i'th server, $S_i$ is a code number of the i'th server, i is a positive integer value.

14. The method according to claim 1, wherein the unique number (r0) is a process identification number.

15. The method according to claim 10, wherein each checksum ($C_i$) is used to be deflated by the first server for verifying successively the respective private keys on the data thus checking an unaffected completion of the entire path when the mobile agent returns back to the first server ($S_0$).

16. A system comprising:

at least a first server coupled with a plurality of servers ($S_0, S_1, \ldots, S_n$); and a mobile agent (MA) from said first server that must pass through at least a number of the servers according to an appropriate succession that defines a path of the mobile agent, wherein each of the plurality of servers ($S_0, S_1, \ldots, S_n$) has a pair of a public key ($KS_0, \ldots, KS_i, \ldots, KS_n$) and a private key ($PKS_0, \ldots, PKS_i, \ldots, PKS_n$) and an ip-address (ip($S_0$), \ldots, ip($S_n$)), respectively, and wherein each server the mobile agent has to pass through is associated with a secret symmetric key ($S_i$Ko), wherein the mobile agent has a unique number assigned to it and is configured to provide its path and data intended for any one of the servers jointly encrypted within a nested structure, the nested structure being built by encoding within a recursive workflow the data and the path jointly in a nested structure including a number of nested terms corresponding to the number of servers, each nested term being decryptable by exactly one server of the number of servers in such a manner that each server of the numbers of servers gets access only to the data intended for it and to a section of the path, respectively, wherein the workflow starts by encoding as a kernel of an innermost term the data ($m_n$) intended for a last server ($S_n$) in the succession with the last server's secret key ($S_n$Ko), combining the unique number (r0), the innermost term's kernel ($\{m_n\}S_n$Ko), an encoded respective secret key ($\{S_n$Ko$\}KS_n$), a respective data authentication code (h($KS_0$, $S_n$Ko)) and an ip-address (ip($S_n$)) of the last server ($S_n$) and an ip-address (ip($S_{n-1}$)) of the second to last server ($S_{n-1}$) and encoding that combination with the private key ($PKS_0$) of the first server ($S_0$), thus forming the innermost term and serving combined with the ip-address of the last server and the data intended for the second to last server as kernel of a second innermost term in the nested structure, and continuing accordingly by generating successively the terms of the nested structure correspondingly to the innermost term, wherein each secret key ($S_iKo$) and the public key $KS_0$) of the first server are encrypted, via a wrapping function (h), thus forming for each respective server ($S_i$) an authentication code (h($KS_0$, $S_iKo$)).

17. The system according to claim 16, wherein the nested structure is computed by the first server ($S_0$) which sends the mobile agent (MA) out.

18. The system according to claim 16, wherein each of the nested terms to be decoded by the respective servers for access to the respective data is defined according to:

$$\text{Data}\_S_i = [r0, ip(S_0), ip(S_i), \{S_iKo\}KS_i, h(KS_0, S_iKo), \{m'_i\}S_iKo]PKS_0$$

wherein i is a positive integer value, r0 is a unique number, $ip(S_i)$ and $ip(S_{i-1})$ are the respective ip-addresses of servers $S_i$ and $S_{i-1}$ respectively, $S_iKo$ is a respective server's secret key, $KS_i$ is the respective server's public key, h is a wrapping function, $KS_0$ is the first server's public key, $PKS_0$ is the first server's private key and $m'_i$ is the i'th term of the nested terms which is defined as follows:

$$m'_i = m_i, ip(S_{i+1}), \text{Data}\_S_{i+i}$$

wherein $ip(S_{i+1})$ is the respective ip-address of server $S_{i+1}$, and $m_i$ is the data intended for the i'th server $S_i$.

19. The system according to claim 18, wherein the unique number (r0) is used only once and is calculated based on a program code (PA) of the mobile agent (MA).

20. The system according to claim 19, wherein the program code (PA) of the mobile agent (MA) is maintained in a Java Archive file (JAR).

21. The system according to claim 20, wherein the Java Archive file (JAR) is signed by the first server's private key (PK $S_0$).

22. The system according to claim 20, wherein the Java Archive file (JAR) contains the unique number (r0) assigned to the mobile agent (MA).

23. The system according to claim 21, wherein the agent's program code (PA) and the data of the mobile agent (MA) are serialized separately.

24. The network system according to claim 16, wherein each of the plurality of servers ($S_0, S_1, \ldots, S_n$) is configured to receive the mobile agent which has been prepared by the first server by encoding the chosen unique number (r0) with the private key ($PKS_0$) of the first server ($S_0$), thus forming an agent specific initialisation number ($C_0$) as a basis for a sequence of checksums ($C_0, \ldots, C_i, \ldots, C_n$) to be computed successively by the number of servers ($S_0, S_1, \ldots, S_n$), and sending the mobile agent together with its initialisation number ($C_0$) on its route passing thereby the number of servers ($S_0, S_1, \ldots, S_n$) successively, to encode when being passed the initialisation number ($C_0$) together with data ($X_i$) to be added at said server with said server's private key ($PKS_i$) and to compute therewith a new server specific checksum ($C_i$) using the public key ($KS_0$) of the first server ($S_0$) and a checksum ($C_{i-1}$) computed by a server ($S_{i-1}$) right before in the succession, and to send the mobile agent further to a next server ($S_{i+1}$) within the succession.

25. The system according to claim 24, wherein the sequence of checksums is defined by a functional rule:

$$C_i = \{C_{i-1}, [X_i, [r0]PKS_0]PKS_i, S_i\}KS_0$$

wherein $C_i$ is the i'th checksum, $X_i$ is the data to be added at the i'th server, r0 is the unique number, $PKS_0$ is the private key of the first server, $KS_0$ is the public key of the first server, $PKS_i$ is the private key of the i'th server, $S_i$ is a code number of the i'th server, i is a positive integer value.

26. A computer program product having a non-transitory computer-readable medium and a computer program stored on the computer-readable medium with program code comprising instructions that, when executed, cause a computer to protect data and a path of a mobile agent (MA) from a first server within a network system having a plurality of servers ($S_0, S_1, \ldots, S_n$), wherein the mobile agent has to pass a number of the servers according to an appropriate succession that defines the path of the mobile agent, by:

jointly encrypting the path and data intended for any one of the servers within a nested structure, the nested structure being built up on a number of nested terms corresponding to the number of servers, each nested term being decryptable by exactly one server of the number of servers in such a manner that each server of the number of servers gets access only to the data intended for it and to a section of the path, respectively; and sending the mobile agent through the path, wherein each of the plurality of servers has a pair of a public key ($KS_0, \ldots, KS_i, \ldots, KS_n$) and a private key ($PKS_0, \ldots, PKS_i, \ldots, PKS_n$) and an ip-address ($ip(S_0), ip(S_1), \ldots, ip(S_n)$), respectively, and further comprising instructions that, when executed cause the computer to choose a unique number (r0) and assigning it to the mobile agent;

choose for each server the mobile agent has to pass a secret symmetric key ($S_iKo$), respectively, and assigning $S_iKo$ to that respective server ($S_i$);

encode each secret key ($S_iKo$) with the public key ($KS_i$) of the respective server ($S_i$);

encrypt each secret key ($S_iKo$) and the public key ($KS_0$) of the first server via a wrapping function (h), thus forming for each respective server ($S_i$) an authentication code (h($KS_0$, $S_iKo$)); and encode via a recursive workflow the data and the path jointly in a nested structure consisting of a number of nested terms corresponding to the number of servers, the workflow starting by encoding as kernel of an innermost term the data ($m_n$) intended for a last server ($S_n$) in the succession with the last server's secret key ($S_nKo$), combining the unique number (r0), the innermost term's kernel ($\{m_n\}S_nKo$), an encoded respective secret key ($\{S_nKo\}KS_n$), a respective data authentication code (h($KS_0, S_nKo$)) and an ip-address ($ip(S_n)$) of the last server ($S_n$) and an ip-address ($ip(S_{n-1})$) of the second to last server ($S_{n-1}$) and encoding that combination with the private key ($PKS_0$) of the first server ($S_0$), thus forming the innermost term and serving, combined with the ip-address of the last server and the data intended for the second last server, as kernel of a second innermost term in the nested structure, and continuing accordingly by generating successively the terms of the nested structure correspondingly to the innermost term.

* * * * *